Sept. 16, 1969   L. S. HARTZOG   3,466,997
CHICKEN FRYING EQUIPMENT
Filed March 8, 1967   5 Sheets-Sheet 1
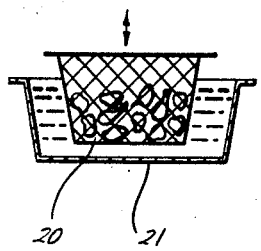
Fig. 1
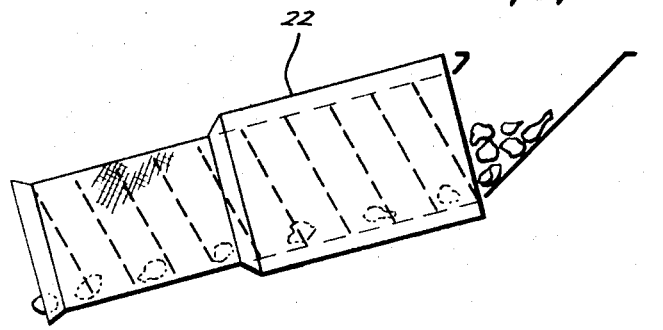
Fig. 2
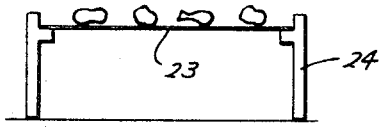
Fig. 3
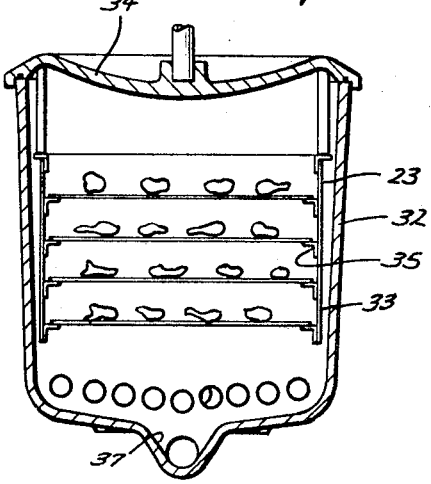
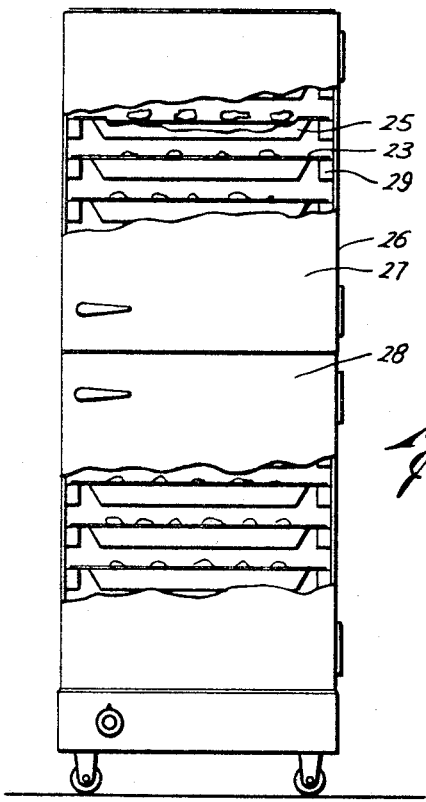
Fig. 4
Levy S. Hartzog
INVENTOR
BY Bertram A. Mann
ATTORNEY

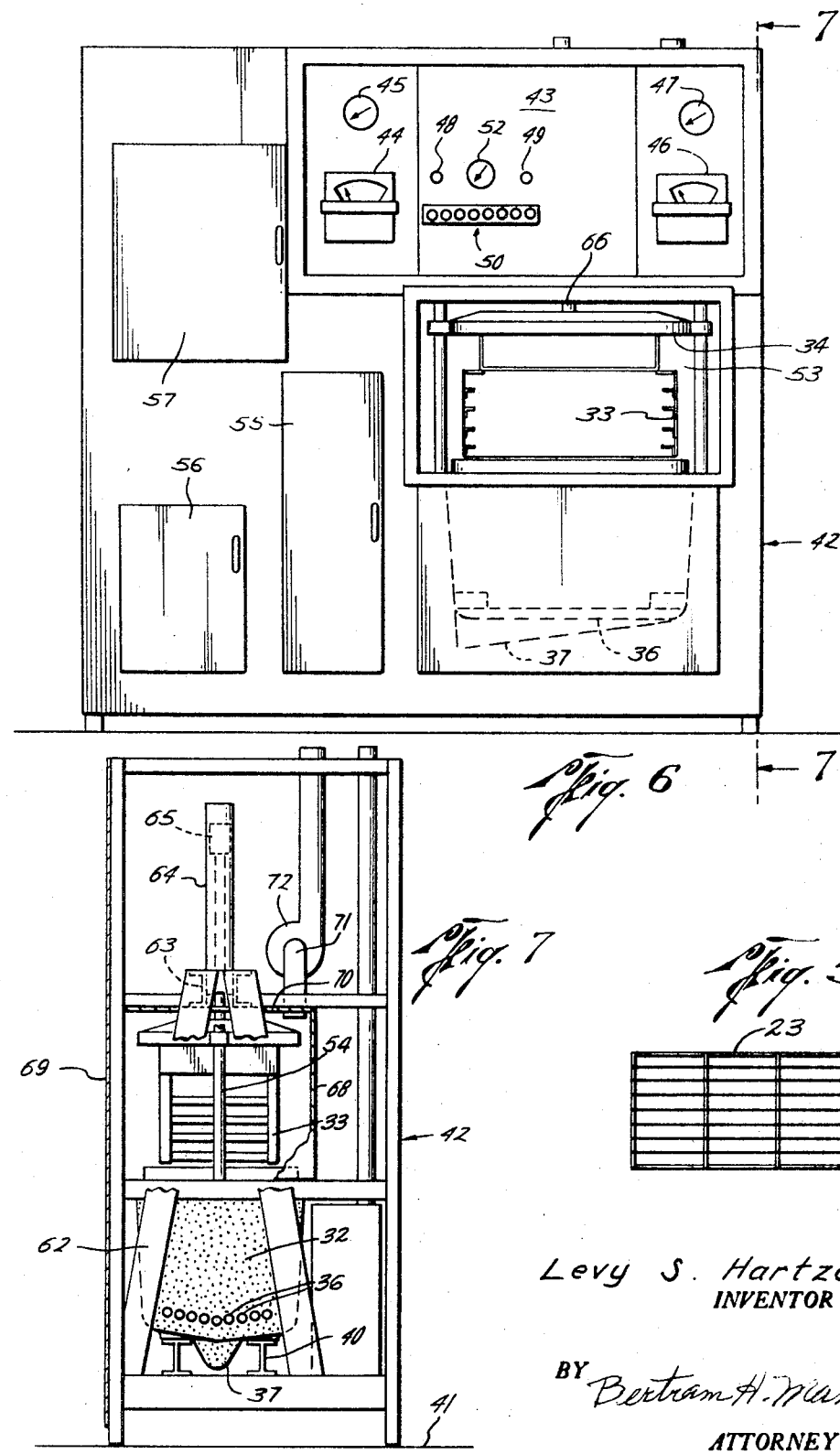

Sept. 16, 1969  L. S. HARTZOG  3,466,997
CHICKEN FRYING EQUIPMENT
Filed March 3, 1967  5 Sheets-Sheet 3
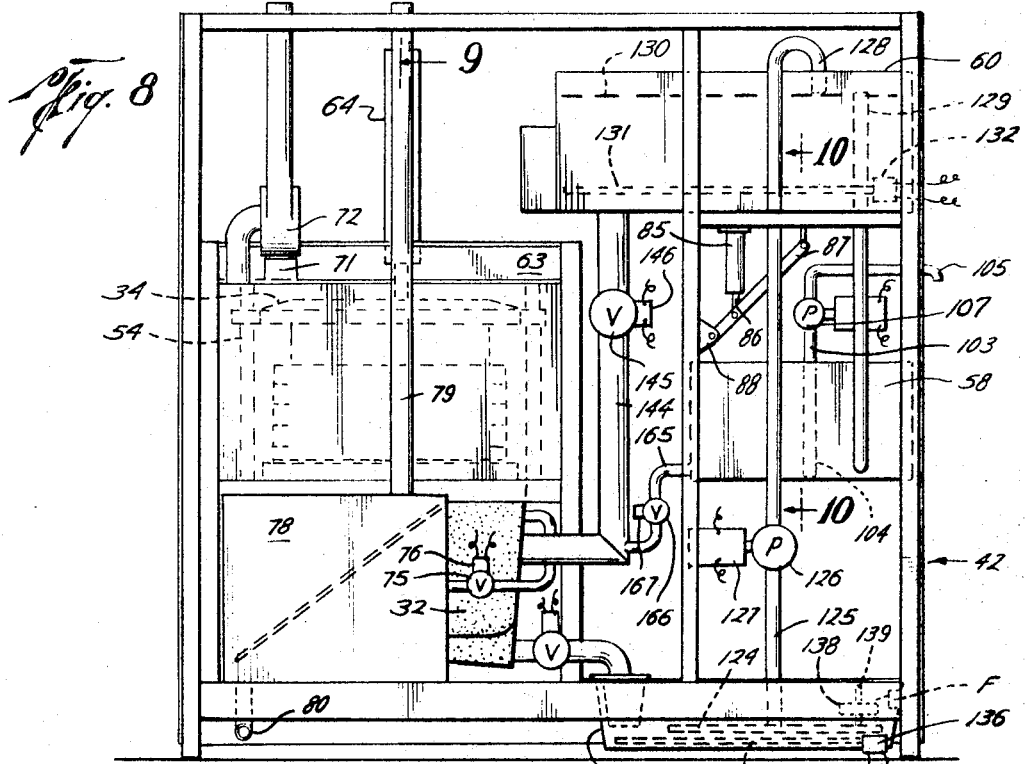
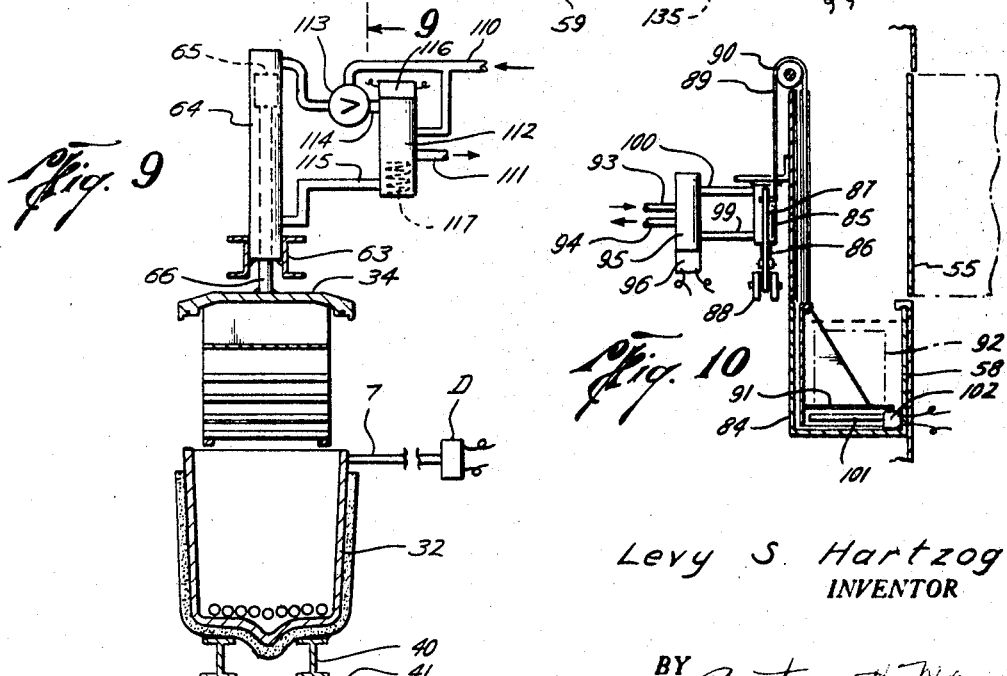
Levy S. Hartzog
INVENTOR
BY Bertram H. Mann
ATTORNEY Sept. 16, 1969  L. S. HARTZOG  3,466,997
CHICKEN FRYING EQUIPMENT
Filed March 8, 1967  5 Sheets-Sheet 4

STOP  START

DIFF. PRESSURE SWITCH

TIMER

FLOAT SWITCH

FAST HEAT RELAY

FILL RELAY

DRAIN RELAY

Levy S. Hartzog
INVENTOR

BY Bertram H Mann

ATTORNEY

Sept. 16, 1969　　　　　　L. S. HARTZOG　　　　　　3,466,997
CHICKEN FRYING EQUIPMENT

Filed March 8, 1967　　　　　　　　　　　　　　　5 Sheets-Sheet 5

Levy S. Hartzog
INVENTOR

BY Bertram H. Mann
ATTORNEY

United States Patent Office 3,466,997
Patented Sept. 16, 1969

3,466,997
CHICKEN FRYING EQUIPMENT
Levy S. Hartzog, Memphis, Tenn., assignor to Kentucky Fried Chicken Corporation, Nashville, Tenn., a corporation of Kentucky
Filed Mar. 8, 1967, Ser. No. 621,675
Int. Cl. A47j 27/08, 29/02, 37/12
U.S. Cl. 99—330
22 Claims

ABSTRACT OF THE DISCLOSURE

A deep-fat chicken frying pressure cooker pot is provided with a sealable lid having rack supports depending therefrom for immersing chicken or other material to be cooked in the hot fat when the lid is sealed on the pot. The cooking proceeds through a timed period and under carefully controlled temperature and pressure conditions, after which the pot pressure is automatically released and the lid and chicken-carrying racks lifted for storage in a warming cabinet for later consumption. Convenient means are provided for filtering the cooking fat after ever cooking operation and for recharging the pressure cooker pot with the exact desired amount of cooking liquid. The cooking rack supports and warming oven accommodate standard bakery-type bun racks.

BACKGROUND OF THE INVENTION

Field of the invention.—This invention relates to semi-automatic cooking means, particularly for mass production of fried chicken pieces and for conveniently storing the chicken for later serving without the necessity of an operator transferring the chicken, piece by piece, from the cooker pot to storage trays, as has been the practice heretofore.

Description of the prior art.—Various pressure cooking methods, including adjustment of temperatures, pressures, and timing, have long been known. Furthermore, breaded chicken pieces have been cooked by pressure cooker and stored in warming cabinets for later service, particularly in the self-service fried chicken restaurants which are now popular. However, such cooking methods and equipment have embodied a considerable amount of skilled or semi-skilled labor resulting in considerable expense and lack of uniformity, and the work conditions have been quite unfavorable, particularly during hot weather.

SUMMARY OF THE INVENTION

According to the present invention, there is provided a large, generally rectangular pressure cooker pot having a lid from which are suspended rack supports properly positioned for accommodating standard bakery bun racks or screens. Powered means are provided for immersing the racks, loaded with properly moistened, seasoned, and breaded chicken pieces, into the hot cooking fat in the pot and sealing the lid while automatically starting a timer. When the pot reaches a predetermined pressure, say 15 p.s.i. gauge, and temperature, the burner is cut off. At the end of the timed cooking period, the steam pressure in the pot, created due to evaporation of moisture in the chicken and its coating, is automatically released, and when the pressure drops to a safe degree, the lid is lifted by its power means. The chicken racks are inserted in closely fitting bun pans and are then bodily transferred to a warming oven having rack supports to accommodate the pans so that individual handling of the cooked chicken pieces is reduced to a minimum. Convenient means are also provided for draining the cooking fat into a filter chamber after each cooking operation, filling the pot with preheated, filtered cooking fat in exactly the proper quantity and repeating the exactly controlled cooking cycle as before explained. During the cooking cycle, the filtered fat is transferred to a preheat tank from which the cooking pot is later refilled.

BRIEF DESCRIPTION OF THE DRAWINGS

In the accompanying drawings,
FIG. 1 is a vertical sectional illustration of chicken moistening equipment;
FIG. 2 is an elevation illustrating the second or chicken breading step in the preparation of chicken for frying;
FIG. 3 is an enlarged vertical transverse section through the novel pressure cooker pot with the lid and racks in cooking positions;
FIG. 4 is an elevation with parts broken away and sectioned illustrating a warming oven;
FIG. 5 is a plan view of a cooking and storage rack or drip screen;
FIG. 6 is a front view of the novel cooking apparatus;
FIG. 7 is a side view of the apparatus with parts broken away and sectioned;
FIG. 8 is a rear view of the novel apparatus, certain wiring and control parts being schematically represented;
FIG. 9 is a section taken substantially on line 9—9 of FIG. 8 and illustrating the cooker pot and lid with suspended cooking rack, wiring and control parts being schematically represented;
FIG. 10 is a section taken substantially on line 10—10 of FIG. 8, wiring and control parts being schematically represented.

DESCRIPTION OF THE PREFERRED EMBODIMENTS

Figure 11:
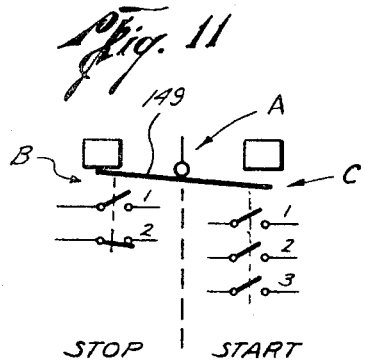
FIGS. 11–17, inclusive, are detail diagrams of various control switches and relays.

FIGS. 1–4 illustrate the procedure used in an establishment equipped with the novel apparatus herein disclosed for preparing, cooking, and storing chicken for later consumption. First, as in FIG. 1, unjointed chicken pieces in a wire strainer 20 are dipped in a liquid such as milk in a pan 21. Next the pieces are passed through a rotating breading drum 22 and thence discharged upon a wire drip rack 23 mounted on supports 24. These drip racks are rectangularly shaped and approximately 16½ inches wide by 25 inches long and fit in standard bun pans, as at 25 in FIG. 4, which are approximately 18 inches by 26 inches. These pans, also being rectangular, are commercially obtainable without special order. Warming cabinet 26 has front doors 27 and 28 and internal pan-supporting cleats 29. Suitable moistening and heating means (not shown) are also provided, as is customary. This warming cabinet is a standard commercial bakery item as are the bun pans and drip trays or screens, and will preserve fried chicken in good condition for service hot to customers several hours later.

The pressure cooker pot 32 is also of generally rectangular form and of adequate size to readily accommodate rack supports 33 suspended from sealing cover 34 and provided with rack-supporting cleats 35. The pot, of course, must be non-porus and able to withstand the cooking temperatures and pressures contemplated without damage. Cleats 35 are located so as to space racks 23 approximately 2½ inches apart. With four of the drip screens or racks mounted on the rack supports 33, sixteen unjoined chickens of conventional frying size may be cooked at once. Preferably, the interior of pot 32 is substantially larger than the overall outline dimensions of rack supports 33, the volume of cooking liquid in the pot in an exemplary form being approximately twice the overall volume of the racks and supports.

Extending along the bottom wall of the pot are electric heater elements 36, and the bottom wall at the center provides an inclined sump 37 for the draining of cooking liquid therefrom. As better shown in FIGS. 7 and 9, pot 32 is substantially insulated for maximum heat retention and is mounted on I-beams 40 which rest upon the floor 41 of a large cooker cabinet 42. The front wall of this cabinet (FIG. 6) consists of upper paneling 43 upon which are mounted various temperature and pressure indicating scales 44, 45, 46, and 47, indicator lights 48 and 49, a plurality of manual control switches indicated at 50, and timer scale 52. The pot 32 is mounted beneath the control panel, and an opening 53 above the pot provides for access to rack supports 33 for loading and unloading of drip trays bearing pieces of chicken or other material. At the left side of the cabinet front wall are doors 55, 56, and 57 for providing access to pre-melt tank 58, filter tank 59, and preheat tank 60 (FIG. 8).

Projecting upwardly from each side of cooking pot 32 are a pair of parallel guide rods 54 upon which the lid 34 slides. Upwardly-converging structural members 62 outwardly of guide rods 54 (FIG. 7) support a pair of parallel horizontal channel beams 63 upon which is mounted the hydraulic cylinder 64 which, with slidable piston 65 therein and piston rod 66, constitutes a double-acting hydraulic motor for raising and lowering the lid and rack supports 33 with respect to cooking pot 32. Sheeting as at 68, 69, and 70 partially encloses the cooking pot as a protective measure. Projecting through top wall 70 is a vent stack 71 having an exhaust pump 72 therein. Pot 32 may be vented through a pipe 74 having a "blow-down" or exhaust valve 75 therein provided with an actuating motor 76. Pipe 74 opens into a trap 78 from which extend an exhaust stack 79 and a drain pipe 80.

FIG. 8 shows the relative locations of the filter, premelt, and preheat tanks 59, 58, and 60 and pot 32. As better shown in FIG. 10, door 55 and back wall 84 project upwardly from the corresponding walls of pre-melt tank 58. Mounted on or adjacent rear wall 84 is an hydraulic cylinder 85 from which projects downwardly a piston rod 86 connected at its lower end intermediately to a lever 87 pivoted at its lower end to clevis 88. A cord 89 secured to the free end of link 87 extends over a sheave wheel 90, thence downwardly adjacent wall 84 to a filler tray 91. This tray is open at the front and top for receiving a block of solid cooking fat, as at 92. FIG. 10 also illustrates schematically a main hydraulic pressure line 93 and exhaust line 94 controlled by a valve 95 having an operating solenoid or other motor 96 for directing hydraulic pressure alternatively through tube lines 99 and 100 for energizing hydraulic motor 85, etc., to controllably add additional cooking fat to pre-melt tank or vat 58. A heater coil 101 at the bottom of tank 58 is provided with a control thermostatic switch 102.

Also communicating with the pre-melt chamber is a wash tube 103 which dips into the chamber, as at 104 (FIG. 8), and has an external fitting or spigot 105 for attachment of a flexible hose line 106 (FIG. 18) leading to the cooker pot. A pump 107 in pipe 103 is operated by a motor 108.

FIG. 9 illustrates schematically the hydraulic controls for lid-actuating hydraulic motor 64, 65. etc. Hydraulic pressure line 110 and exhaust line 111 connect with slide valve chambe 112 as shown, and pressure line 110 also connects directly with a locking-type check valve 113. The slide valve alternately directs the hydraulic pressure to lines 114 and 115 for moving lid 34, respectively, downwardly and upwardly. Check valve 113 is of such character as to be opened leftwardly, e.g., toward cylinder 64, when hydraulic pressure exists in lines 110 and 115. However, should the hydraulic pressure fail, check valve 113 will prevent the loss of hydraulic pressure from the upper portion of cylinder 64, thus locking piston 65 and lid 34 in their downward positions until the slide valve is reversed. The slide valve is urged in the lid closing direction by a solenoid 116, when energized, and in the lid opening direction by a spring 117.

Figure 12:
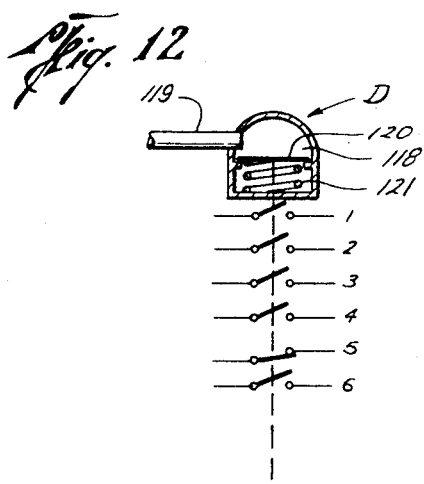
Figure 18:
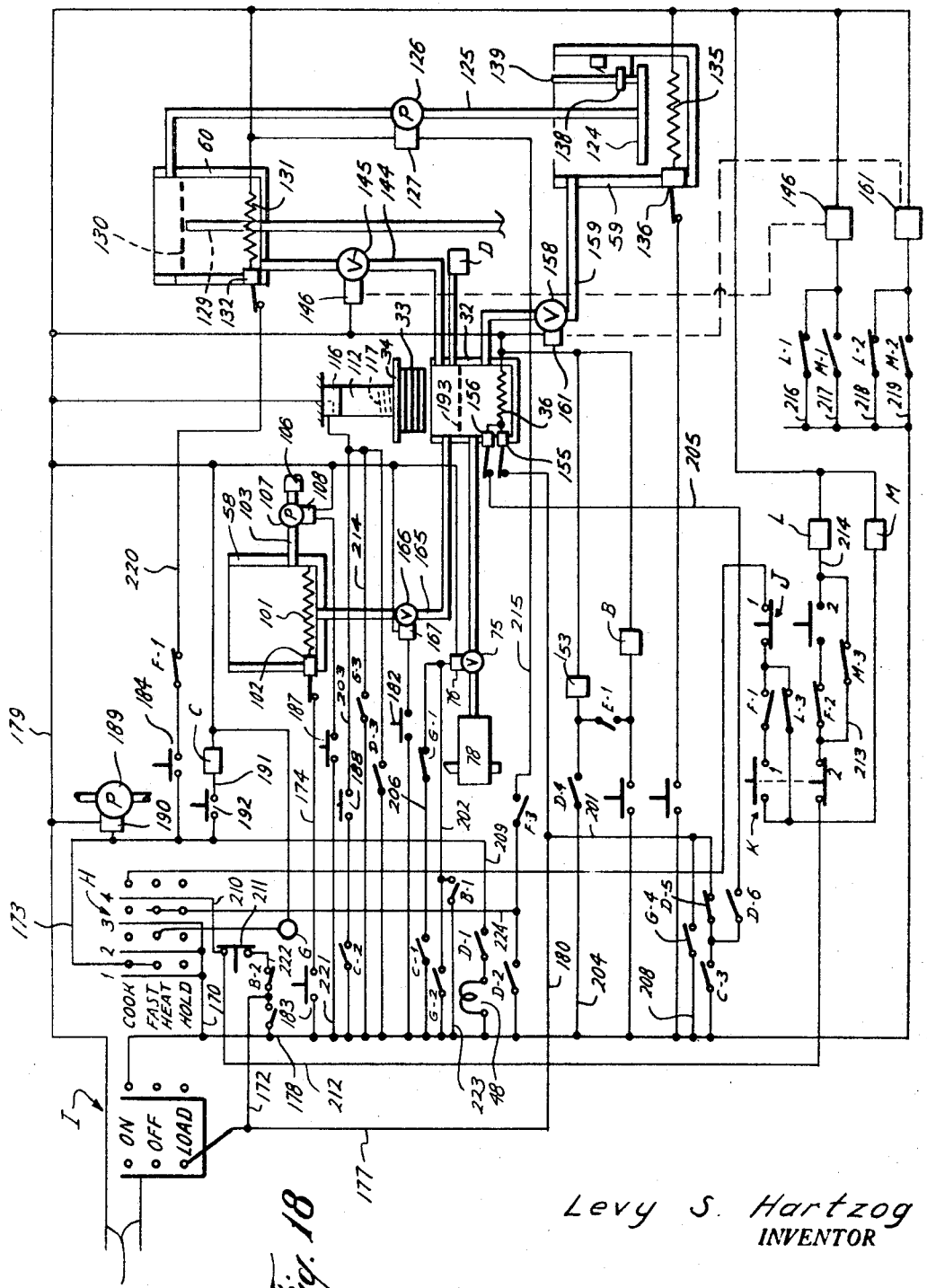
FIG. 18 is a wiring diagram with certain apparatus schematically represented for clarity.

A differential pressure-type switch is schematically represented at D in FIGS. 9, 12, and 18. This switch (FIG. 12) has a pressure chamber 118 connected to the interior of the cooker pot by a pipeline 119 and bounded on one side by a diaphragm 120 constantly urged upwardly by a spring 121. Switch D is designed for actuation of its control diaphragm downwardly when the pot is subjected to a predetermined intermediate pressure, say 6 p.s.i., while motion in the other direction under the influence of spring 121 does not occur until the pot pressure drops to a substantially lower degree, say ¾ p.s.i. Switch D has six sets of sequentially numbered contacts.

Mounted in the lower part of filter tank 59 (FIGS. 8 and 18) is a hollow, disk-type filter 124 from the interior central part of which rises a tube 125 containing a pump 126 actuated by a motor 127. Tube 125 extends over the rear wall of preheat tank 60 and empties thereinto, as at 128 (FIG. 8). A standpipe 129 draining into pre-melt tank 58 limits the quantity of liquid in the preheat tank to the level 130. The quantity of melted cooking liquid in the preheat tank, when filled to the level 130, is the exact amount required for filling cooking pot 32 to the proper level. An electric heating element 131 is provided in the lower part of preheat tank 60 and is controlled by a thermostatic switch 132. Preheat tank 60 is located rearwardly of the top portions of pre-melt tank 58, including hydraulic motor 85, etc. An electric heating element 135 in filter tank 59 has a control thermostatic switch 136. Also mounted in the filter tank is a float 138 which slides on a guide rod 139. A yoke 140 (FIG. 14) or other limit switch actuator is in position to be actuated by the float to actuate switch contacts F–1–4 when the level of liquid in the filter tank rises above or sinks below a certain level. Due to the termination of the outlet pipe above heating element 135, this element will remain submerged in liquid fat in the tank.

A fill pipe 144 extends downwardly from preheat tank 60 to cooking pot 32 and contains a valve 145 controlled by a solenoid or other electric motor 146 for opening and closing the fill valve upon successive movements.

Figure 13:
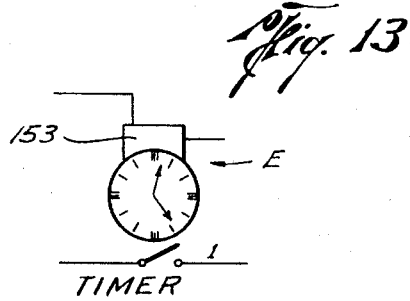
Figure 14:
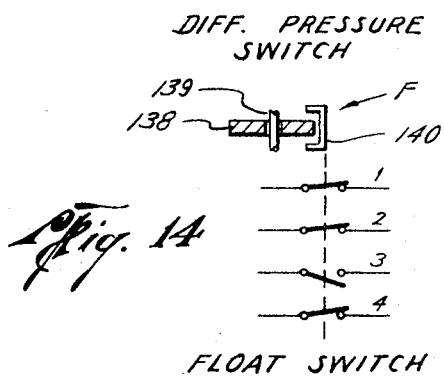
Figure 15:
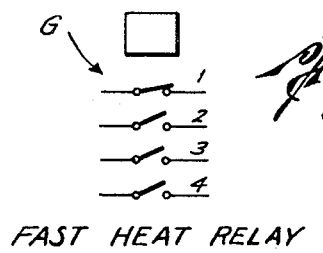
Figure 16:
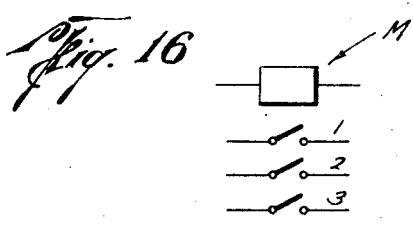
Figure 17:
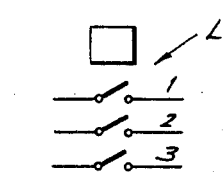

FIG. 11 illustrates a latching relay, generally designated A and having a pivoted actuator beam 149 which is controlled by the "Stop" and "Start" solenoids B and C. Beam 149 controls a pair of contacts designated B–1 and B–2 on its unlatched or "Stop" side and a series of contacts designated C–1–3 on its latched or "Start" side. FIG. 12 illustrates the differential pressure switch device D and the contacts designated D–1–6 controlled thereby. FIG. 13 shows the timer unit E, the motor device 153 for actuating the same, and the contacts E–1 which are closed at the end of the selected time interval. FIG. 14 diagrams the float switch F and its contacts F–1–4. FIGS. 15, 16, and 17 diagram other relays.

FIG. 18 illustrates diagrammatically the assemblage of control and controlled units and the wiring thereof. This wiring is largely functional, and other power gradients and relay arrangements may be needed, as will be understood by skilled electrical technicians. The heating element for the cooking pot is provided with high temperature and low temperature thermostatic switches 155 and 156. In an exemplary arrangement, high temperature thermostat 155 is set to limit the temperature of the liquid in the cooking pot to a maximum temperature on the order of 375° F., while low temperature thermostat 156 is designed to energize element 36, under its operating conditions, when the temperature of the cooking liquid drops below a desirable minimum cooking temperature of, say, 285° F. Thermostatic switch 136 in filter tank 59 is set for 295° F. Thermostatic switch 102 in pre-melt chamber 58 is designed to maintain the supplies of cooking liquid therein at a suitable melt temperature of, say, 150° F. to 175° F. Thermostatic switch 132 in the preheat chamber 60 is adjusted to bring the cooking liquid therein to the desired high starting temperature for cooking, e.g., 375° F., as previously stated. A valve 158 in drain pipe 159 connecting pot 32 with filter tank 59 has an actuating motor 161. Fill valve 145 in line 144, between preheat tank 60 and the cooking pot, has an actuating motor 146, as previously pointed out. An additional line 165 connects pre-melt tank 58 and pot 32 and is equipped with a manual valve 166.

Further description of the wiring and controls will be presented in the following description of the operation of the apparatus. A manual master switch I controls the application of power from main lines 171 and has three positions designated "On," "Off," and "Load" and two rows of contacts designated I–1 and I–2. A manual multiple "Function" switch H has three positions marked "Cook," "Fast Heat," and "Hold" and four rows of contacts designated H–1–4. Bus wires 177 and 178 lead respectively from contact I, row 1, "Load," and contact I, row 2, "On." A return bus wire is shown at 179. The contacts of rows 1–3 of switch H are powered from "On" bus 178 by means of a wire 170. Contacts H–4 are powered from bus 177 by means of wires 210, 222, and 172, as will be explained. Other manual switches will appear from the following description. Hydraulic pump 189 has an actuating motor 190 which will be energized in the "On" position of master switch I through wire 170, function switch contacts H–1, "Cook" and "Fast Heat," and wire 173.

In starting the operation of the apparatus, with master switch I "Off," pot 32 and pre-melt chamber 58 will be charged with cooking fat, preferably in solid block form. The charging of the pre-melt chamber will be facilitated by the hydraulic lowering mechanism illustrated in FIG. 10, which is advantageous, particularly in protecting workmen, when there is already some hot fat in the pre-melt chamber. Master switch I then will be moved to its "Load" position which will energize high heat thermostat 155 and heating element 36 in the cooking pot through wires 180 and 177.

After the charge of fat in pot 32 is fully melted, the level of the fat in the pot may be brought to the optimum level line 193 therein by means of auxiliary fill valve 166, which is opened and closed by manual switch 182, provided the fat in pre-melt tank 58 is melted by closing of manual switch 183 in wire 174, thus energizing heating element 101. Alternatively, fat in the pot may be brought to the optimum level 193 by the manual addition of sufficient solid fat for this purpose. Motor 161 for drain valve 158 will not be energized by means of a double pole switch K interlocked with fill valve switch J. Fill valve switch J, similarly, is a double pole switch, as shown. The wiring of switches J and K is such that when drain valve switch K is moved to open drain valve 158, fill valve 145 will be closed and vice versa. In the "Load" position of master switch I, energy is supplied to the drain and fill valve circuits by a wire 172, a wire 222 containing "Stop" relay contacts B–2 and a manual switch 211, a wire 212 containing drain switch contacts K–2, wire 213 containing now closed fill valve relay contacts M–3, and wire 214 containing drain valve relay coil L. Motor 146 is energized from relay contacts L–1 or M–1 in wires 216 and 217. Valve motor 161 is energized by relay contacts M–2 or L–2 in wires 218 and 219. Valves 145, 158, and 166 are of the type to alternately open and close upon successive movements in the same direction. After draining, the pot is refilled, as before.

The equipment is now ready for a cooking operation, and master switch I is moved to its "On" position, "Function" switch H is moved to its "Cook" position, and "Start" button 192 is depressed. Pot high heat thermostat 155 will be energized through wires 178 and 201, the latter containing now closed "Start" relay contacts C–3 and normally closed pressure switch contacts D–5. Alternatively, the pot fat may be more quickly brought to cooking temperature by moving of "Function" switch H to "Fast Heat" which energizes lid closing solenoid 116 through a wire 213, for energizing "Fast Heat" relay G, and closes relay contacts G–3 in wire 214, other normally open contacts G–2 of this relay in a wire 202 causing opening of "blow-down" valve 75. After the proper cooking temperature is registered on pot temperature dial 46, "Function" switch H is returned to "Cook" position. Thermostat 155 cuts out coils 36 when the temperature of the liquid in the cooking pot reaches the optimum temperature for beginning cooking—for instance, 375° F. The other thermal indicator 44 indicates the temperature of the liquid in preheat chamber 60 which should register the same temperature as meter 46. At the same time, "blow-down" valve closing motor 76 will be energized through a wire 206 containing now closed "Start" relay contacts C–1. When supports 33 beneath the lid are loaded with chicken on the drip screens, manual switch 188 will be closed and held closed to energize solenoid 116 by means of wire 203 containing now closed "Start" relay contacts C–2. This shifts slide valve 112 against spring 117 to direct hydraulic pressure through pipe 114 and locking check 113 to the top of hydraulic cylinder 64, thus moving piston 65, lid 34, and the loaded rack downwardly for seating the lid sealingly on the pot and immersing the chicken-loaded racks in the hot fat in the pot. The operator can quickly stop the downward movement of the lid, in case of difficulty, as due to an overhanging chicken piece, by simply releasing switch 188. This causes immediate reversal of valve 112. As previously explained, locking check valve 113 positively prevents the lifting of lid 34 even though the hydraulic pressure supply or electric supply should fail, until the slide valve is affirmatively reversed. This prevents accidental opening of the lid with high pressure in the pot.

After sealing of the lid, evaporation of moisture in the chicken and its coating will produce steam pressure within pot 32. When the optimum cooking pressure in the pot, say 15 p.s.i., is reached, pressure switch device D (FIG. 12) will be actuated to reverse all of its switch contacts. Immediately the driving motor 153 of timer E (FIG. 13) will be energized through wire 204 containing now closed pressure switch contacts D–4. High heat thermostat 155 will be de-energized due to opening of normally closed pressure switch contacts D–5 in wire 208. Normally open contacts D–6 in wire 205 controlling low heat thermostat 156 will be closed. However, thermostatic switch 156 insures that the latter element will be energized only when the pot temperature drops to the 250° F. cooking minimum temperature selected. Also, closing of normally open contacts D–3 will bypass manual lid closing switch 188, as signalled by lamp 48 energized by contacts D–1 in wire 209. Switch button 188 can then be released. During the entire cooking period for which the timer is set—for instance, ten minutes—the pressure in pot 32 will be maintained uniform by a conventional pressure-limiting valve (not shown). Closing of pressure relay contacts D–2 will energize filter pump motor 127 by means of a wire 215 also containing float relay contacts F–3 so that the fat in the filter tank will be transferred to preheat tank 60 during cooking. Preheat coils 131 will be energized by means of manual switch 184 in a wire 220 also containing normally closed float switch contacts F–1.

While filter chamber 59 is of ample size to hold whatever liquid may be drained thereinto from the cooking pot, including wash-down fat after the regular cooking charge has been drained, overflow standpipe 129 in the preheat chamber (FIG. 8) will limit the volume of liquid in this chamber to the exact amount required for bringing liquid in the pot to the optimum level 193, as will be explained.

When the set cooking time has elapsed, timer contacts E-1 close, energizing the coil of "Stop" relay B. The resultant closing of "Stop" relay contacts B-1 in wire 223 will open "blow-down" valve 75. When the pot pressure reaches a safe minimum, say ¾ or 1 p.s.i., differential pressure switch D will reverse. Opening of contacts D-4 will stop and reset the timer motor, and opening of contacts D-3 will de-energize slide valve solenoid 116 permitting reversal of slide valve 112 with resultant lifting of lid 34 and the load of chicken. After lifting of the lid and removal of the chicken, the used cooking fat should be subjected to filtration. This can be easily done by reversal of "Drain" switch K which, as explained, opens drain valve 158 and automatically closes fill valve 145.

Now to repeat the cooking operation, with switch 170 remaining in its "On" position, "Function" switch H in "Cook" position, and "Stop" relay B energized, the pot will be washed down with hot grease from the pre-melt chamber by actuation of wash switch 187 in wire 221 to energize pump 107 and force grease through hose 106. Since drain valve 158 remains open, this wash liquid drains into the filter tank and ultimately is pumped to preheat tank 60 together with the cooking fat previously drained from the pot. This insures filling of the preheat tank to constant level 130. Rack supports 33 will again be charged with breaded chicken. As previously explained, the constant level of liquid maintained in the preheat chamber by the overflow standpipe 129 insures the dropping of the proper amount of cooking fat into pot 32. "Start" switch 192 in wire 191 will again be closed to energize "Start" relay solenoid C. As before, this closes "blow-down" valve 75 by means of contacts C-1 and energizes high heating thermostat 155 through now closed contacts C-3 in wire 208. Lid lowering button 188 may now be closed and held closed until green signal lamp 48 is illuminated due to closing of pressure switch contacts D-1. Pressure switch contacts D-5 will insure cutting off of high temperature thermostat 155 in the pot. Thus, during most of the cooking period, no heat is supplied to the cooking liquid, and the temperature thereof will slowly drop. In a recent test of the novel apparatus, eight minutes were required to lower the temperature of the cooking fat to the desired minimum of 285° F. At that temperature, thermostatic switch 156 will close to energize heating coils 36 and prevent further lowering of the cooking temperature.

As explained, at the end of the timed cooking period, "blow-down" valve 75 will again open and, when the pot pressure lowers sufficiently, the lid and load of chicken will be raised automatically for unloading. If no further cooking is to be done for a matter of several hours, master switch 170 may be moved to "Off" position to allow the equipment to cool. Alternatively, "Function" switch H may be moved to "Hold" wherein all heaters remain under control of their manual switches and thermostats and filter pump 126 is under the control of float switch contacts F-3 by means of wires 224 and 215.

At the end of the cooking of a particular load of chicken, the trays 23 with cooked chicken pieces thereon will be transported to the warming cabinet 26 (FIG. 4) where the racks or screens, inserted in standard bun pans or sheet pans 25, will be stored in the warming cabinet 26. Thus, in addition to permitting the use of standard, relatively inexpensive chicken handling equipment, the amount of labor required is greatly reduced with the use of the herein-disclosed novel apparatus and the quality of the cooked chicken is improved. For instance, it is generally possible for a single employee to operate a carry-out fried chicken establishment which, by previous methods, has required the use of at least three cooking employees. Such substantial savings place the user of the novel equipment in a favorable economic position. Furthermore, the novel apparatus prepares much more uniform fried chicken than has been possible heretofore where the timing, temperature, and pressure conditions must be controlled by the chef through observation of visible meter scales.

Also, at the end of each cooking operation, the fat will be transferred to the filter by closing of drain valve switch K. Contaminants, such as burned chicken pieces which may affect the flavor and color of the chicken, are removed. Moreover, the single step operation using a relatively large quantity of hot cooking fat, the temperature of which gradually lowers from the high beginning temperature to the minimum cooking temperature near the end of the cooking period, results in much simplified operational procedures and, therefore, less expensive control equipment and the elimination of the necessity of the provision of a skilled employee who can control the browning and cooking periods.

More automatic features may be provided readily, but it is believed that the degree of automation provided in the presently described apparatus will adequately serve the needs of semi-skilled employees, while avoiding operational difficulties often inherent in automatic machinery. The invention may be modified in various respects as will occur to those skilled in the art, and the exclusive use of all modifications as come within the scope of the appended claims is contemplated.

I claim:

1. Pressure cooking apparatus comprising a rectangular cooking pot, means for heating said pot, a closure lid for said pot and a rectangular food support rack both supported above said pot, said food support rack having horizontally disposed guiding means to receive rectangular trays in a stacked relationship to carry layers of food, and means for moving said rack within said pot and said lid into its closure position on said pot.

2. Food cooking apparatus as described in claim 1 in which said rack is movable by said lid into its cooking position within said pot.

3. Cooking apparatus as described in claim 2 in which said rack is secured to and supported by said lid.

4. Food cooking apparatus as described in claim 3 further including cooperating sealing means on said pot and said lid whereby said pot is adapted for pressure cooking.

5. Cooking apparatus as described in claim 3 in which said pot and lid constitute a pressure cooker and further including powered means for elevating and lowering said lid.

6. Cooking apparatus as described in claim 5 in which said powered means comprises a fluid motor, means for supplying pressured fluid to said motor, and valve means cooperating with said fluid motor to lock said lid in sealing engagement on said pot.

7. Cooking apparatus as described in claim 5 in which said powered means includes a fluid motor operatively connected to said lid and manual means for energizing said motor to cause lowering of said lid into seating engagement on said pot.

8. Cooking apparatus as described in claim 5 further including an exhaust duct leading from said pot, an exhaust valve in said duct, and preset timing means operatively connected to said valve and said powered means for causing release of pressure in said pot after a predetermined cooking interval and initiating, thereafter, elevation of said lid and rack from said pot.

9. Cooking apparatus as described in claim 8 further including filter means adjacent said pot and means for transferring cooking liquid from said pot to said filter means and back to said pot after lifting of said lid.

10. Cooking apparatus as described in claim 9 further including a preheat vessel, means for transferring filtered liquid from said filter means to said vessel, and means for transferring a predetermined quantity of preheated cooking liquid from said vessel to said pot.

11. Cooking apparatus as described in claim 9 in which said powered means includes a source of pressured fluid and ducting connecting said source and said motor, manual means including a valve in said ducting having first and second positions, means normally biasing said valve towards said first position, a device responsive to a first predetermined elevated pressure in said pot for holding said valve in said first position irrespective of said manual control.

12. Food cooking apparatus as described in claim 1 in which said pot is adapted for containing cooking liquid up to a predetermined level and said rack is shaped for supporting food immersed in said liquid.

13. Food cooking apparatus as described in claim 1 further including a receptacle adjacent said pot for storing a supply of said cooking liquid, and means including a pump for transferring cooking liquid between said pot and said receptacle.

14. Food cooking apparatus comprising a cooking pot, food support rack means in said pot, a reservoir for cooking liquid, means for transferring cooking liquid from said reservoir to said pot, and means for closely controlling the quantity of cooking liquid supplied to said pot as determined by the position of said rack means in said pot.

15. Cooking apparatus as described in claim 14 further including a filter between said pot and said reservoir for filtering impurities from cooking liquid transferred from said pot to said receptacle.

16. Cooking apparatus as described in claim 14 including liquid level indicator in said pot, said transferring means including a pump operable to feed cooking liquid into said pot to raise the liquid level therein in accordance with said indicator.

17. Food cooking apparatus as described in claim 14 further including means for delivering cooking liquid from said pot to said reservoir.

18. Apparatus for frying chicken comprising a generally rectangular pressure cooker pot with a removable lid, at least one cooking rack, and support means for mounting said rack in horizontal cooking position in said pot, said rack being a standard bakery bun rack of substantially 16½ inches by 25 inches rectangular dimensions.

19. Chicken frying apparatus as described in claim 18 further including a warming cabinet and supports in said cabinet for mounting said racks whereby racks bearing cooked chicken may be transported from said pot to said cabinet for storage.

20. Chicken frying apparatus as described in claim 18 in which said rack is mounted beneath said lid and movable to its cooking position in said pot as said lid is applied on said pot.

21. Chicken frying apparatus as described in claim 20 in which a plurality of said racks are mounted beneath said lid and removable therefrom, when said lid is lifted from said pot, for transport to and storage in said cabinet.

22. Apparatus for cooking comprising an upwardly opening vat for containing the cooking medium, heating means adjacent said vat for heating the cooking medium, a rack having a plurality of vertically spaced and horizontally disposed shelves for supporting the food to be cooked, means including a piston-cylinder assembly for movably supporting said rack beneath said piston cylinder assembly for movement between a raised position above said vat in which said rack is raised out of said vat for loading the food thereon and for draining the food, and a lowered position in which said rack is disposed in said vat for cooking of the food, said piston-cylinder assembly being positioned above said rack, means operably connected to said means supporting said rack for initiating movement of said means supporting said rack to move said rack towards said lowered position, and timing means operably connected to said means supporting said rack for causing said rack at a predetermined time to move automatically towards said raised position.

References Cited

UNITED STATES PATENTS

| | | | |
|---|---|---|---|
| 519,580 | 5/1894 | Kelsey | 99—448 |
| 2,243,661 | 5/1941 | Tota | 99—330 |
| 2,287,396 | 6/1942 | Roth | 99—403 XR |
| 2,568,792 | 9/1951 | Cripps | 99—335 |
| 2,767,095 | 10/1956 | Smith. | |
| 3,107,601 | 10/1963 | Longmire | 99—330 |
| 3,187,664 | 6/1965 | Jennings. | |
| 3,273,489 | 9/1966 | Wilson | 99—339 XR |
| 3,280,722 | 10/1966 | Rahauser | 99—332 |
| 3,364,845 | 1/1968 | Wilson et al. | 99—407 XR |

BILLY J. WILHITE, Primary Examiner

U.S. Cl. X.R.

99—336, 339, 407, 408, 411, 417